(12) United States Patent
Oyman

(10) Patent No.: US 9,357,272 B2
(45) Date of Patent: May 31, 2016

(54) DEVICE ORIENTATION CAPABILITY EXCHANGE SIGNALING AND SERVER ADAPTATION OF MULTIMEDIA CONTENT IN RESPONSE TO DEVICE ORIENTATION

(71) Applicant: Intel Corporation, Santa Clara, CA (US)

(72) Inventor: Ozgur Oyman, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 695 days.

(21) Appl. No.: 13/719,402

(22) Filed: Dec. 19, 2012

(65) Prior Publication Data

US 2014/0040959 A1 Feb. 6, 2014

Related U.S. Application Data

(60) Provisional application No. 61/679,627, filed on Aug. 3, 2012, provisional application No. 61/719,241, filed on Oct. 26, 2012.

(51) Int. Cl.
*G06F 15/16* (2006.01)
*H04N 21/61* (2011.01)
(Continued)

(52) U.S. Cl.
CPC ........ *H04N 21/6131* (2013.01); *H04L 41/0836* (2013.01); *H04L 43/0811* (2013.01); *H04L 67/303* (2013.01); *H04N 21/23439* (2013.01);
(Continued)

(58) Field of Classification Search
CPC .................. H04N 21/6131; H04N 21/25825; H04N 21/25833; H04N 21/2662; H04L 41/0836; H04L 67/18; H04L 67/303; H04L 65/608; H04W 16/28; H04W 4/026

USPC ............ 709/203, 217, 219, 220, 231; 725/62
See application file for complete search history.

(56) References Cited

U.S. PATENT DOCUMENTS

2003/0110234 A1  6/2003 Egli et al.
2004/0083291 A1  4/2004 Pessi et al.
(Continued)

FOREIGN PATENT DOCUMENTS

EP    2 336 995 A2   6/2011
JP   2003296232 A   10/2003
(Continued)

OTHER PUBLICATIONS

3GPP TSG SA4, Mid-Call Control of Far-end Video Orientation & Size, Samsung Electronics Co., Ltd., Tdoc S4-120718, # 69 meeting, May 21-25, 2012, 2 pages.*

(Continued)

*Primary Examiner* — Frantz Jean
(74) *Attorney, Agent, or Firm* — Stoel Rives LLP

(57) ABSTRACT

Capability exchange signaling techniques provide orientation sensor information from UEs to network servers. The orientation sensor information describes a device's support for orientation sensor capabilities, or a current orientation state of the device. Based on such information, a multimedia server provides different encoded versions of multimedia content for different device orientation modes supported by the device. The server may also adapt, dynamically and in real-time, media capture or transcode parameters for creating content tailored (i.e., optimized) for the device's current orientation mode, or for its various intermediate orientation states and spatial positions.

33 Claims, 7 Drawing Sheets

(51) Int. Cl.

| | |
|---|---|
| *H04L 29/08* | (2006.01) |
| *H04N 21/258* | (2011.01) |
| *H04N 21/262* | (2011.01) |
| *H04N 21/2662* | (2011.01) |
| *H04N 21/422* | (2011.01) |
| *H04N 21/442* | (2011.01) |
| *H04N 21/845* | (2011.01) |
| *H04W 4/02* | (2009.01) |
| *H04L 12/24* | (2006.01) |
| *H04L 12/26* | (2006.01) |
| *H04N 21/2343* | (2011.01) |
| *H04W 24/02* | (2009.01) |
| *H04W 24/04* | (2009.01) |
| *H04W 40/02* | (2009.01) |
| *H04L 29/06* | (2006.01) |
| *H04W 16/28* | (2009.01) |

(52) U.S. Cl.
CPC ... *H04N 21/25825* (2013.01); *H04N 21/25833* (2013.01); *H04N 21/2662* (2013.01); *H04N 21/26258* (2013.01); *H04N 21/42202* (2013.01); *H04N 21/44218* (2013.01); *H04N 21/6125* (2013.01); *H04N 21/8456* (2013.01); *H04W 4/026* (2013.01); *H04W 24/02* (2013.01); *H04W 24/04* (2013.01); *H04W 40/02* (2013.01); *H04L 65/1016* (2013.01); *H04L 65/601* (2013.01); *H04L 67/18* (2013.01); *H04W 16/28* (2013.01); *Y02B 60/50* (2013.01)

(56) References Cited

U.S. PATENT DOCUMENTS

| | | |
|---|---|---|
| 2004/0266391 A1 | 12/2004 | Hafren |
| 2006/0026513 A1 | 2/2006 | Eschbach et al. |
| 2006/0184532 A1 | 8/2006 | Hamada et al. |
| 2008/0189360 A1 | 8/2008 | Kiley et al. |
| 2008/0209442 A1 | 8/2008 | Setlur et al. |
| 2009/0044128 A1 | 2/2009 | Baumgarten et al. |
| 2009/0319181 A1 | 12/2009 | Khosravy et al. |
| 2010/0060792 A1 | 3/2010 | Corlett et al. |
| 2010/0130213 A1 | 5/2010 | Vendrow et al. |
| 2011/0138018 A1 | 6/2011 | Raveendran et al. |
| 2011/0179185 A1 | 7/2011 | Wang et al. |
| 2012/0079276 A1 | 3/2012 | Evans et al. |
| 2012/0110120 A1 | 5/2012 | Willig et al. |
| 2012/0139953 A1 | 6/2012 | Griffin |
| 2012/0220221 A1* | 8/2012 | Moosavi ......... H04M 1/274516 455/41.1 |
| 2013/0038634 A1 | 2/2013 | Yamada et al. |
| 2013/0113993 A1* | 5/2013 | Dagit, III ................ G06F 3/017 348/552 |
| 2014/0307802 A1 | 10/2014 | Wang et al. |

FOREIGN PATENT DOCUMENTS

| | | |
|---|---|---|
| JP | 2008079228 A | 4/2008 |
| JP | 2009059160 A | 3/2009 |
| RU | 2370900 C2 | 10/2009 |
| RU | 2377736 C2 | 12/2009 |
| WO | 2004/072764 A2 | 8/2004 |
| WO | 2004/072765 A2 | 8/2004 |
| WO | 2008083959 | 7/2008 |
| WO | 2009101245 A1 | 8/2009 |
| WO | 2010/128962 A1 | 11/2010 |
| WO | 2013/090349 A1 | 6/2013 |

OTHER PUBLICATIONS

3GPP TS 26.237, "IP Multimedia Subsystem (IMS) based Packet Switch Streaming (PSS) and Multimedia Broadcast/Multicast Service (MBMS) User Service", V11.0.0, Jun. 2012, 142 pages.

Gabin, et al., "3GPP Mobile Multimedia Streaming Standards", IEEE Signal Processing Magazine, vol. 24, No. 6, Nov. 2010, pp. 134-138.

Lohmar, et al., "Dynamic Adaptive HTTP Streaming of Live Content", IEEE International Symposium on a World of Wireless, Mobile and Multimedia Networks (WoWMoM), Jun. 2011,, 7 pages.

TSG-SA4, "Video Orientation", Telefon AB LM Ericsson, ST-Ericsson SA, Tdoc S4 (12)0684, # 69 meeting, May 21-25, 2012, 6 pages.

3GPP TSG SA4, "Mid-call Control of Far-end Video Orientation & Size", Samsung Electronics Co., Ltd., Tdoc S4-120718, # 69 meeting, May 21-25, 2012, 2 pages.

3GPP, "Transparent end-to-end Packet-switched Streaming Service (PSS); Protocols and codecs", 3GPP TS 26.234, V9.3.0, Release 9, Jun. 2010, 182 pages.

3GPP ETSI, "UMTS; LTE; PSS; Progressive Download and Dynamic Adaptive Streaming over HTTP (3GP-DASH) (3GPP TS 26.247 V10.0.0 Release 10)", 126 247 V10.0.0, Jun. 2011, 96 pages.

International Searching Authority, International Search Report and Written Opinion received for PCT Patent Application No. PCT/US2013/047284, mailed on Oct. 25, 2013, 12 pages.

Adzic et al., "Optimized adaptive HTTP streaming for mobile devices", Applications of Digital Image Processing, vol. 8135, Sep. 12, 2011, 10 pages.

\* cited by examiner

DEVICE ORIENTATION CAPABILITY EXCHANGE SIGNALING AND SERVER ADAPTATION OF MULTIMEDIA CONTENT IN RESPONSE TO DEVICE ORIENTATION

RELATED APPLICATIONS

The present application claims the benefit of priority under 35 U.S.C. §119(e) to U.S. Provisional Patent Application No. 61/679,627, filed Aug. 3, 2012, which is hereby incorporated by reference herein in its entirety; and to U.S. Provisional Patent Application No. 61/719,241, filed Oct. 26, 2012, which is hereby incorporated by reference herein in its entirety.

BACKGROUND INFORMATION

The growth of multimedia services, including streaming and conversational services, drives improved mobile broadband technologies and standards. High consumer demand for multimedia services coupled with developments in media compression and wireless network infrastructures provide opportunities for enhancing the multimedia service capabilities of cellular and mobile broadband systems. The service capabilities are typically enhanced by delivering high quality of experience (QoE) to the consumers while ensuring ubiquitous access to video content and services from any location, at any time, with any device type and technology. To enable delivery of multimedia content with high QoE in a ubiquitous fashion, technologies and standards support various mobile devices and to provide media handling procedures and session management protocols tailored for various device classes and capabilities.

Mobile devices frequently include an orientation sensor that indicates the device orientation with respect to a reference such as gravitational pull or other orientation references. Software applications executed on these devices have used the device orientation information to determine the device orientation mode or state, and adjust device functions according to detected orientation modes. For example, mobile-device software applications often rotate video content displayed on a user interface display to portrait or landscape mode based on the detected orientation mode of the device. Therefore, mobile devices used to display real-time video communication content often rely on orientation sensors to determine, independently of a server that provides the content, whether to rotate and align the received content for display according to the detected device orientation mode.

Capability exchange signaling (or simply, capability signaling) enables multimedia content servers to provide a wide range of devices with content tailored for the particular client mobile device (called user equipment, or simply, UE) that is requesting the content. Capability signaling is a standardized function for servers that may employ one or more streaming service standard types, including the Third Generation Partnership Project (3GPP) packet switched streaming service (PSS), dynamic adaptive streaming over HTTP (DASH), and integrated multimedia subsystem (IMS) based PSS and multimedia broadcast and multicast service (MBMS) (abbreviated as IMS_PSS_MBMS). For example, capability signaling is standardized in 3GPP TS 26.234, "Transparent end-to-end packet switched streaming service (PSS); Protocols and codecs"; 3GPP TS 26.247, "Transparent end-to-end packet switched streaming service (PSS); Progressive download and dynamic adaptive streaming over HTTP (3GP-DASH)"; and in 3GPP TS 26.237, "IP Multimedia Subsystem (IMS) based Packet Switch Streaming (PSS) and Multimedia Broadcast/Multicast Service (MBMS) User Service; Protocols."

DETAILED DESCRIPTION OF EMBODIMENTS

This disclosure describes capability exchange signaling techniques that provide orientation sensor information from UEs to network servers. The orientation sensor information describes a device's support for orientation sensor capabilities, or a current orientation state of the device, according to some embodiments. For example, a multimedia content server obtains information that a client UE includes an orientation sensor. Based on such information, the server provides different encoded versions of multimedia content for different device orientation modes supported by the device. The server may also adapt, dynamically and in real-time, media capture or transcode parameters for creating content tailored (i.e., optimized) for the device's current orientation mode, or for its various intermediate orientation states and spatial positions. These techniques provide the server an opportunity to adapt content on the network side and facilitate an improved client experience.

The techniques described in this disclosure may be used for both two-dimensional (2D) and three-dimensional (3D) video applications, as well as for other network services that accept from UE control inputs based on the UE orientation sensor information. For example, in the case of 2D video content, portrait and landscape video view angles (or intermediate viewing angles therebetween) may be used by the server to create or identify specific video content streams that have been encoded for display at the supported viewing angles. For 3D video content, different viewing angles relative to a reference (such as gravitational pull) or changes in spatial position of the device provide orientation information that may be used to adapt (e.g., transcode or control video capture camera equipment) content based on device orientation.

Figure 1:
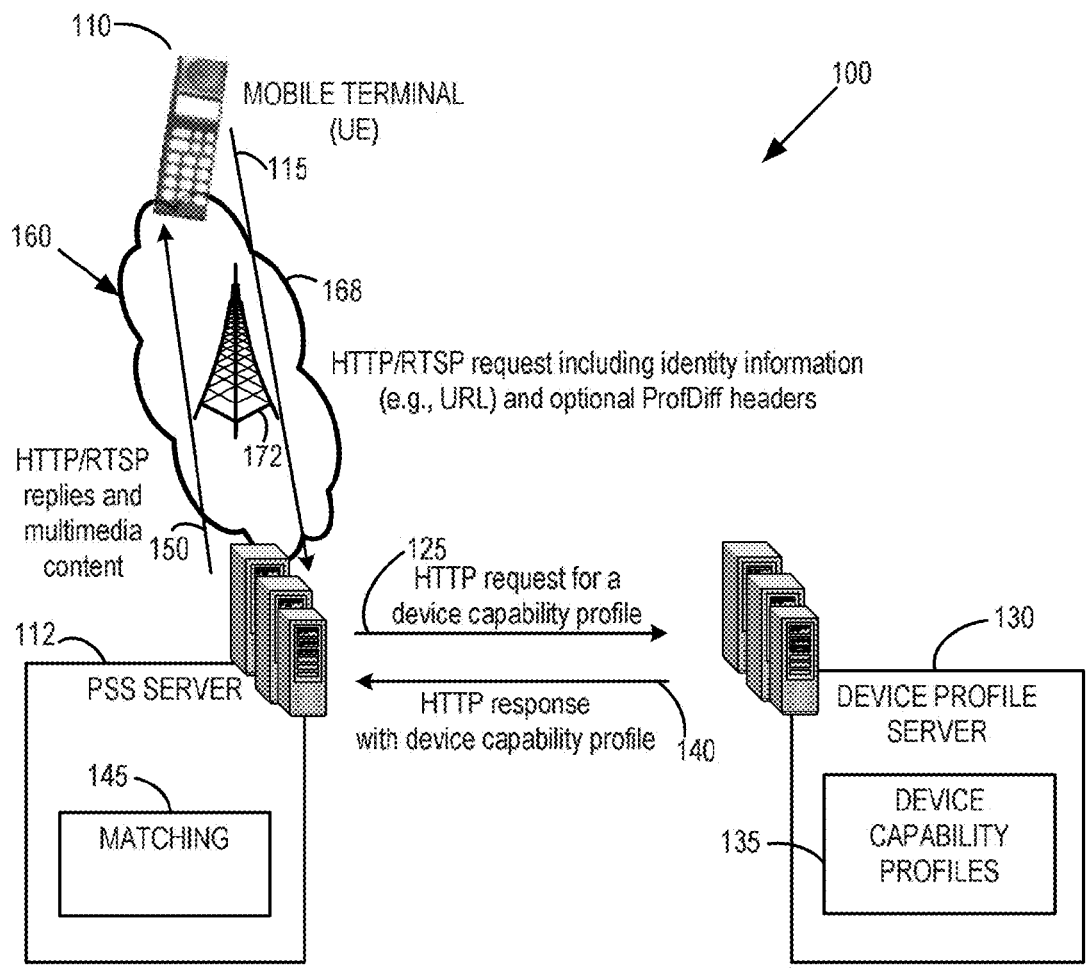
FIG. 1 is a block diagram of PSS components performing capability exchange signaling, according to one embodiment.

FIG. 1 illustrates an example of a capability exchange signaling system 100 for PSS. A mobile terminal 110 (or UE 110) describes 115 to a PSS server 112 its identity by including in an HTTP request a model type and manufacturer, a URL for locating a device capability profile, or other identifying information. The server 112 then requests 125 a corresponding device capability profile from a device profile server 130, which stores device capability profiles 135 that each list capabilities of a particular mobile terminal type. The server 112 receives 140 the corresponding profile and matches 145 multimedia content tailored to the device 110 according to information obtained from the device capability profile that indicates supported orientation modes. Selected multimedia content is then streamed 150 to the device 110 using a streaming protocol such as HTTP or RTSP.

During the set-up of a streaming session, the server 112 uses information in the device capability profile to provide the mobile terminal 110 with compatible multimedia content. Therefore, the server 112 is also referred to as a remote media content server 112, media server 112, web server 112, or the like. In other words, server 112 obtains via a network, information describing the capabilities of a mobile terminal, which the server 112 uses to determine media content stream(s) to provision to the connecting terminal. For instance, the server 112 could compare the playback capabilities and features of the mobile terminal to identify multiple available variants of a media stream that are compatible with the connecting terminal. The terminal 110 can then request an identified stream. In some embodiments, servers use the device capability profile to select or create a session description protocol (SDP) file (in the context of PSS or IMS_PSS_MBMS) or media presentation description (MPD) metadata file (in the context of DASH), which identifies streams tailored for the capabilities of the connecting terminal 110.

FIG. 1 also schematically illustrates a network environment 160 in accordance with various embodiments. The network environment 160 includes the UE 110 wirelessly coupled with a radio access network (RAN) 168. The RAN 168 includes an enhanced node base station (eNB) 172 configured to communicate with the UE 110 via an over-the-air (OTA) interface. The RAN 168 may be part of a third generation partnership project (3GPP) long-term evolution (LTE) advanced network and may be referred to as an EUTRAN. In other embodiments, other radio access network technologies may be utilized.

The UE 110 may communicate with the remote media server 112 through the RAN 168. While the eNB 172 is shown communicating directly with network entities via the RAN 168, it will be understood that the communications may flow through a number of intermediate networking components, e.g., switches, routers, gateways, or other network devices, in various embodiments. For example, in some embodiments, the RAN 168 may be coupled with a core services network (CSN) that communicatively couples the RAN 168 with a larger network, e.g., a wide area network, of which the media server 112 may be considered a part.

While FIG. 1 describes the network environment as a wireless communication network, other embodiments may be used in other types of networks, e.g., wire-line networks. It may be understood that other network environments in which embodiments of the present invention may be employed may include additional, fewer, or different components than those explicitly shown in the example depicted in FIG. 1. For example, embodiments of the present invention employed in a wire-line network, may have the media server 112 and the UE 110 communicating with one another without the RAN 168.

Figure 2:
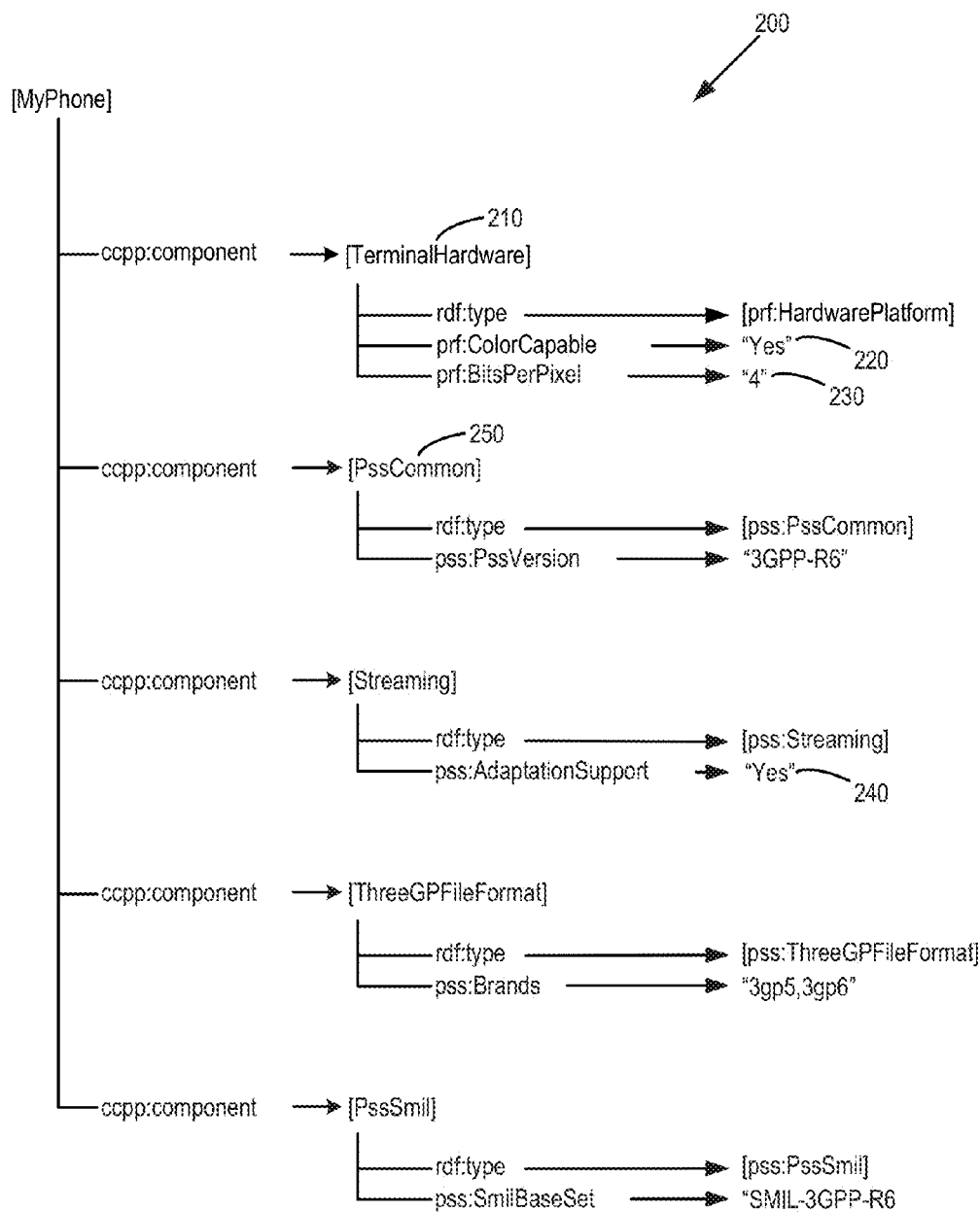
FIG. 2 is a graph in Resource Description Framework (RDF) notation showing a device capability profile for PSS and IMS_PSS_MBMS streaming services, according to one embodiment.

FIG. 2 shows an example of metadata information 200 included in a device capability profile for PSS and IMS_PSS_MBMS services. A device capability profile is an electronic document file that includes metadata information in an extensible markup language formatted according an RDF schema, as specified in the World Wide Web Consortium (W3C) Recommendation: "RDF Vocabulary Description Language 1.0: RDF Schema", http://www.w3.org/TR/2004/RECrdf-schema-20040210/, February 2004. The device capability profile RDF document follows the structure of the Composite Capabilities/Preference Profiles (CC/PP), which is a vocabulary extension of the RDF, as specified in W3C Recommendation: "Composite Capability/Preference Profiles (CC/PP): Structure and Vocabularies 1.0", http://www.w3.org/TR/2004/REC-CCPP-struct-vocab-20040115/, January 2004). In some embodiments, the device capability profile is a User Agent Profile (UAProf), which is an application of CC/PP that is concerned with describing capability and preference information specific to wireless devices. In other words, UAProfs—specified in the Open Mobile Alliance: "User Agent Profile Version 2.0", February 2006—include a vocabulary of attributes that have values used to specify UE capabilities and preferences.

FIG. 2 shows an example set of attribute names, permissible values, and semantics. As noted above, such information can be used by content providers (e.g., sever 112) to produce or provide content appropriately formatted for the client device, according to certain embodiments described herein. A "[TerminalHardware]" component metadata field 210, for example, indicates that UE 110 is capable of displaying color content 220 at four bits per pixel 230, and supports adaptive streaming 240. Other attributes of interest during device capability signaling (not shown) as specified in the aforementioned TS 26.234 standard, may include (but are not limited to) the following parameters: pre-decoder buffer size; initial buffering period; decoder capability; display properties, such as screen size, resolution, bit depth, or other properties, adaptation support of streaming methods including RTSP, HTTP, or others; QoE support; reporting support for extended Real-time Transport Protocol (RTP) Control Protocol (abbreviated RTCP); fast content switching support; as well as supported RTP profiles and Session Description Protocol (SDP) attributes.

A PSS or IMS_PSS_MBMS server obtains a description of the specific capabilities of the mobile terminal, i.e., the device capability description. For PSS and IMS_PSS_MBMS services parsing orientation capabilities, the UAProf vocabulary is substantially reused and an additional service-specific vocabulary is defined to facilitate server-side content negotiation for streaming. In some embodiments, the PSS vocabulary includes device capability exchange signaling attributes for "Orientation" and "DefaultOrientation." Tables 1 and 2 below show respective examples for "Orientation" and "DefaultOrientation" attributes included in the "[PssCommon]" component metadata field 250 (FIG. 2) of the PSS base vocabulary specified in TS 26.234.

TABLE 1

| | |
|---|---|
| Attribute Name | Orientation |
| Attribute Definition | List of different device orientation states supported by the client |
| Component | PssCommon |
| Type | Literal (Bag) |
| Legal values | "Portrait", "Landscape", "Seascape," and other values (including intermediate viewing angles) supported by UE |

TABLE 1-continued

| | |
|---|---|
| Resolution Rule | Append |
| Example Usage | `<Orientation>`<br>   `<rdf:Bag>`<br>      `<rdf:li>Portrait</rdf:li>`<br>      `<rdf:li>Landscape</rdf:li>`<br>      `<rdf:li>Seascape</rdf:li>`<br>   `</rdf:Bag>`<br>`</Orientation>` |

TABLE 2

| | |
|---|---|
| Attribute Dame | DefaultOrientation |
| Attribute Definition | Default device orientation to be taken as reference for content production/selection |
| Component | PssCommon |
| Type | Literal |
| Legal values | "Portrait", "Landscape", "Seascape," and other values (including intermediate viewing angles) supported by UE |
| Resolution Rule | Locked |
| Example Usage | `<DefaultOrientation>Landscape</DefaultOrientation>` |

In some embodiments, default and current orientation capabilities are defined for both capture and render/display. For example, four attributes defined for the PSSCommon component of the PSS vocabulary as follows: two attributes lists of different device orientation modes supported by the client for capturing and display; and two other attributes provide information for the default device orientation for capturing and display. The default device orientation may be used when an orientation sensor is disabled or not present. An example syntax for these four attributes is as follows:

TABLE 3

| | |
|---|---|
| Attribute Dame | OrientationModesCapture |
| Attribute Definition | List of different device orientation modes supported by the client for capturing |
| Component | PssCommon |
| Type | Literal (Bag) |
| Legal values | "Portrait", "Landscape", "Seascape," and other values (including intermediate viewing angles) |
| Resolution Rule | Append |
| Example Usage | `< OrientationModesCapture >`<br>   `<rdf:Bag>`<br>      `<rdf:li>Portrait</rdf:li>`<br>      `<rdf:li>Landscape</rdf:li>`<br>   `</rdf:Bag>`<br>`</ OrientationModesCapture >` |

TABLE 4

| | |
|---|---|
| Attribute Dame | OrientationModesDisplay |
| Attribute Definition | List of different device orientation modes supported by the client for rendering and display |
| Component | PssCommon |
| Type | Literal (Bag) |
| Legal values | "Portrait", "Landscape", "Seascape," and other values (including intermediate viewing angles) |
| Resolution Rule | Append |
| Example Usage | `< OrientationModesDisplay >`<br>   `<rdf:Bag>`<br>      `<rdf:li>Portrait</rdf:li>`<br>      `<rdf:li>Landscape</rdf:li>`<br>   `</rdf:Bag>`<br>`</ OrientationModesDisplay >` |

TABLE 5

| | |
|---|---|
| Attribute Dame | DefaultOrientationCapture |
| Attribute Definition | Default device orientation for capturing based on the installation of the camera sensor (if orientation sensor is disabled or not present) |
| Component | PssCommon |
| Type | Literal |
| Legal values | "Portrait", "Landscape", "Seascape," and other values (including intermediate viewing angles) |
| Resolution Rule | Locked |
| Example Usage | `<DefaultOrientationCapture> Portrait`<br>`</DefaultOrientationCapture>` |

TABLE 6

| | |
|---|---|
| Attribute Dame | DefaultOrientationDisplay |
| Attribute Definition | Default device orientation for rendering and display (if orientation sensor is disabled or not present) |
| Component | PssCommon |
| Type | Literal |
| Legal values | "Portrait", "Landscape", "Seascape," and other values (including intermediate viewing angles) |
| Resolution Rule | Locked |
| Example Usage | `< DefaultOrientationDisplay > Portrait`<br>`</DefaultOrientationDisplay>` |

In some embodiments, it may be possible that the set of orientation modes may also include further modes that enable rotation of displayed images at intermediate angles (e.g., angles between 90-degree orientation modes) based on the orientation changes of the device. For example, Orientation-ModesCapture and OrientationModesDisplay attributes defined above may also include additional legal values that define intermediate orientation position angles in a granular fashion. Thus, two additional attributes may be used to characterize the capabilities of the device orientation sensor and facilitate orientation-awareness of the device commensurate with the angular granularity at which the device sensor can detect orientation changes during capture or during rendering/display. Examples of such attributes are as follows:

TABLE 7

| | |
|---|---|
| Attribute Dame | OrientationAngularGranularityCapture |
| Attribute Definition | Number of equally-spaced angular granularity levels in a 90 degree interval at which the device sensor can detect orientation changes during capture |
| Component | PssCommon |
| Type | Number |
| Legal values | Integer values between 1 and 8 |
| Resolution Rule | Locked |
| Example Usage | `<OrientationAngularGranularityCapture>2`<br>`</OrientationAngularGranularityCapture>` |

TABLE 8

| | |
|---|---|
| Attribute Dame | OrientationAngularGranularityDisplay |
| Attribute Definition | Number of equally-spaced angular granularity levels in a 90 degree interval at which the device sensor can detect orientation changes during rendering and display |
| Component | PssCommon |
| Type | Number |
| Legal values | Integer values between 1 and 8 |
| Resolution Rule | Locked |
| Example | < OrientationAngularGranularityDisplay >2 |
| Usage | </ OrientationAngularGranularityDisplay > |

In these examples of Tables 7 and 8, the highest possible angular granularity for detection of orientation changes was assumed to be 11.25 degrees, and hence the attribute value is limited to integer values between 1 and 8 that represent eight intermediate positions between to 90-degree orientation modes (e.g., between landscape and portrait). In other embodiments, however, greater or fewer levels of granularity may be enabled by more advanced orientation sensor capabilities. Thus, the attributes of Tables 7 and 8 could also include a higher (or lower) maximum number of legal intermediate values than the eight values specified above.

In some embodiments, attributes of Tables 7 and 8 are combined to characterize the orientation-awareness of the device for both capture and rendering/display. For example, such an attribute may be defined as follows:

TABLE 9

| | |
|---|---|
| Attribute Dame | OrientationAngularGranularity |
| Attribute Definition | Number of equally-spaced angular granularity levels in a 90 degree interval at which the device sensor can detect orientation changes during both capture and rendering/display |
| Component | PssCommon |
| Type | Number |
| Legal values | Integer values between 1 and 8 |
| Resolution Rule | Locked |
| Example | < OrientationAngularGranularity>8 |
| Usage | </OrientationAngularGranularity> |

In another embodiment, an attribute may be defined to identify the number of capture cameras on the terminal—typically more than the value of one would indicate that the device has both a front-facing and a back-facing camera, which might be beneficial for orientation-aware adaptations. Two cameras are typically included in a terminal, however, the maximum number of cameras is assumed as 4 in the embodiment below. Other examples are also possible.

TABLE 10

| | |
|---|---|
| Attribute Dame | NumOfCameras |
| Attribute Definition | Number of cameras on the device |
| Component | PssCommon |
| Type | Number |
| Legal values | Integer values between 1 and 4 |
| Resolution Rule | Locked |
| Example | <NumOfCameras>2 |
| Usage | </NumOfCameras> |

In another embodiment, an attribute may be defined to indicate whether the device supports horizontal mirroring, i.e., horizontal flipping of image after rotation. This attribute may be used for some devices that capture a horizontally-mirrored image due to image-sensor configuration. Therefore, when a server knows that the receiving client supports horizontal mirroring (based on the capability exchange signaling suggested below), the server can provide media that compensates for the mirroring. The horizontal mirroring attribute may include the following syntax:

TABLE 11

| | |
|---|---|
| Attribute Dame | NumOfCameras |
| Attribute Definition | Number of cameras on the device |
| Component | PssCommon |
| Type | Number |
| Legal values | Integer values between 1 and 4 |
| Resolution Rule | Locked |
| Example | <NumOfCameras>2 |
| Usage | </NumOfCameras> |

Referring back to FIG. 1, the device profile server 130 provides device capability profiles to the PSS server 112 in response to an HTTP request 125 message. In some embodiments, the mobile terminal 110 may supplement the identity signaling provided by server 130 with extra attributes or overrides for attributes defined in its default device capability profile. This additional information exchange is denoted as profile difference (ProfDiff) exchange signaling, which temporarily allows for adjusting the attributes of the device capability profile. In one example, such a temporary adjustment may be triggered by user preferences, e.g., if the user for a particular session would like to receive mono sound even though the terminal is capable of processing and producing stereo sound.

In some embodiments, a terminal manufacturer or a software vendor maintains device profile server 130 and updates the profiles 135 with device capability profiles for its UE products. In other embodiments, a dedicated operator manages device profile server 130 for its subscribers and enables the subscribers to make user specific updates to the profiles 135. The device profile server 130 may also be hosted on server hardware shared with the multimedia content server 112, in some embodiments.

A multimedia adaptation method based on the device capability exchange signaling of orientation sensor capabilities of the terminal includes two components. First, the client device signals to the server information indicating whether the client has an orientation sensor and what orientation modes are supported, e.g., portrait, landscape, seascape, or other intermediate states (Table 1). In addition, the client device may also temporarily override the DefaultOrientation (Table 2) attribute by signaling the current device orientation by a ProfDiff exchange signaling. Second, the server considers the orientation sensor support signal from the client device and provides different encoded versions of the content in formats best suited for the different possible device orientation modes (more generally called, orientation states, viewing angles, or simply, orientations). Moreover, if the server also controls the capture processes for the content production/preparation, it may instruct the camera unit to capture and compress multiple copies of the same content best suited for the different possible device orientations. For example, a user streaming a football game could reposition UE 110 to indicate that a camera should zoom in and isolate a particular football player on the football field. The server may also dynamically perform transcoding on-the-fly in order to match the content to the current device orientation.

The above-mentioned multimedia adaptation method based on device orientation may be used for pull-based streaming and push-based streaming paradigms. An example for pull-based streaming is DASH. Examples of push-based streaming include PSS and IMS_PSS_MBMS services based on respective RTSP and session initiation protocol (SIP).

Figure 3:
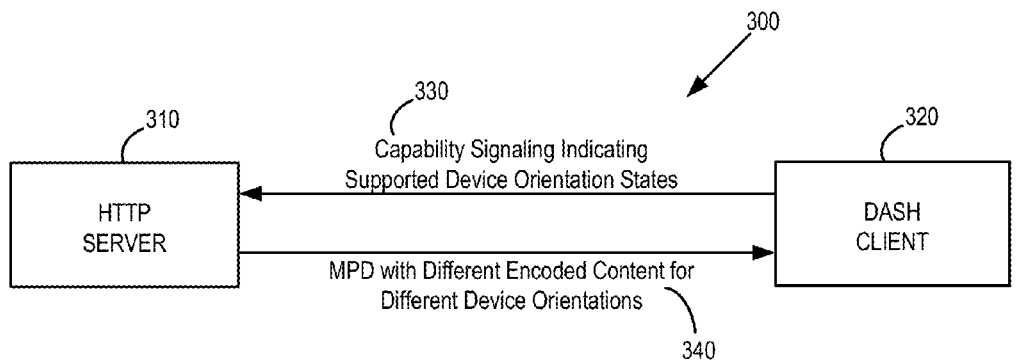
FIG. 3 is a high-level block diagram of a DASH client device and a server for DASH-based streaming multimedia content adapted according to device orientation, according to one embodiment.

FIG. 3 shows a high-level server-client interaction 300 in the context of DASH. In this context, a server 310 may receive 320 device capability exchange signaling from a client device 330 in order to obtain the various supported device orientation states. The device capability signaling 320 may also include the DefaultOrientation attribute (Table 2), which indicates the device orientation in the absence of any further signaling from the client 330. A set of device orientations and corresponding content information are signaled 340 to the client 330 in an MPD metadata file. The client player then monitors the current device orientation state and requests the corresponding versions of content specified in the MPD file that is tailored for the current device orientation. Moreover, when retrieving an MPD with HTTP, the client 330 may include device orientation information in the GET request, including any temporary adjustments to the device orientation based on ProfDiff (current device orientation may be different from the default device orientation). Thus, the HTTP server 310 delivers an optimized MPD 340 to the UE 330.

Figure 4:
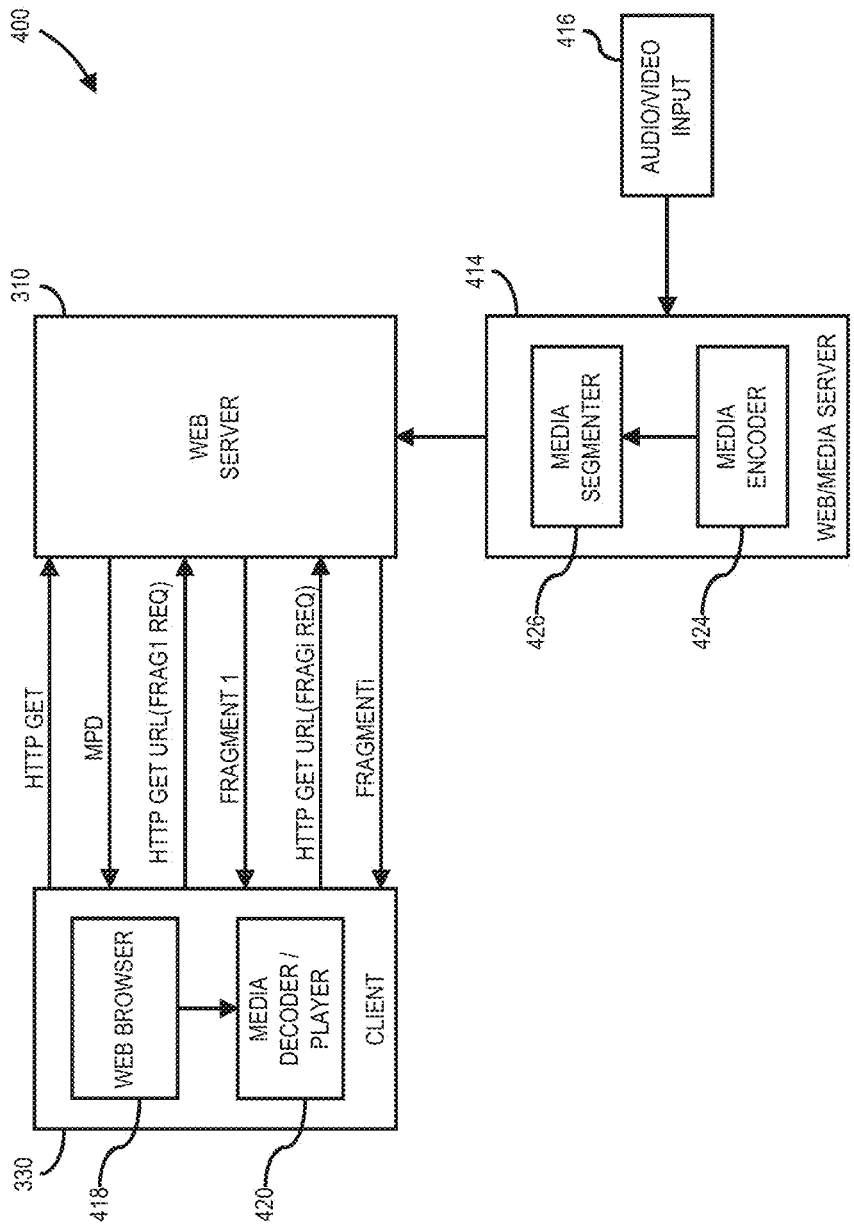
FIG. 4 is a block diagram showing in detail the DASH client and server of FIG. 3.
Figure 6:
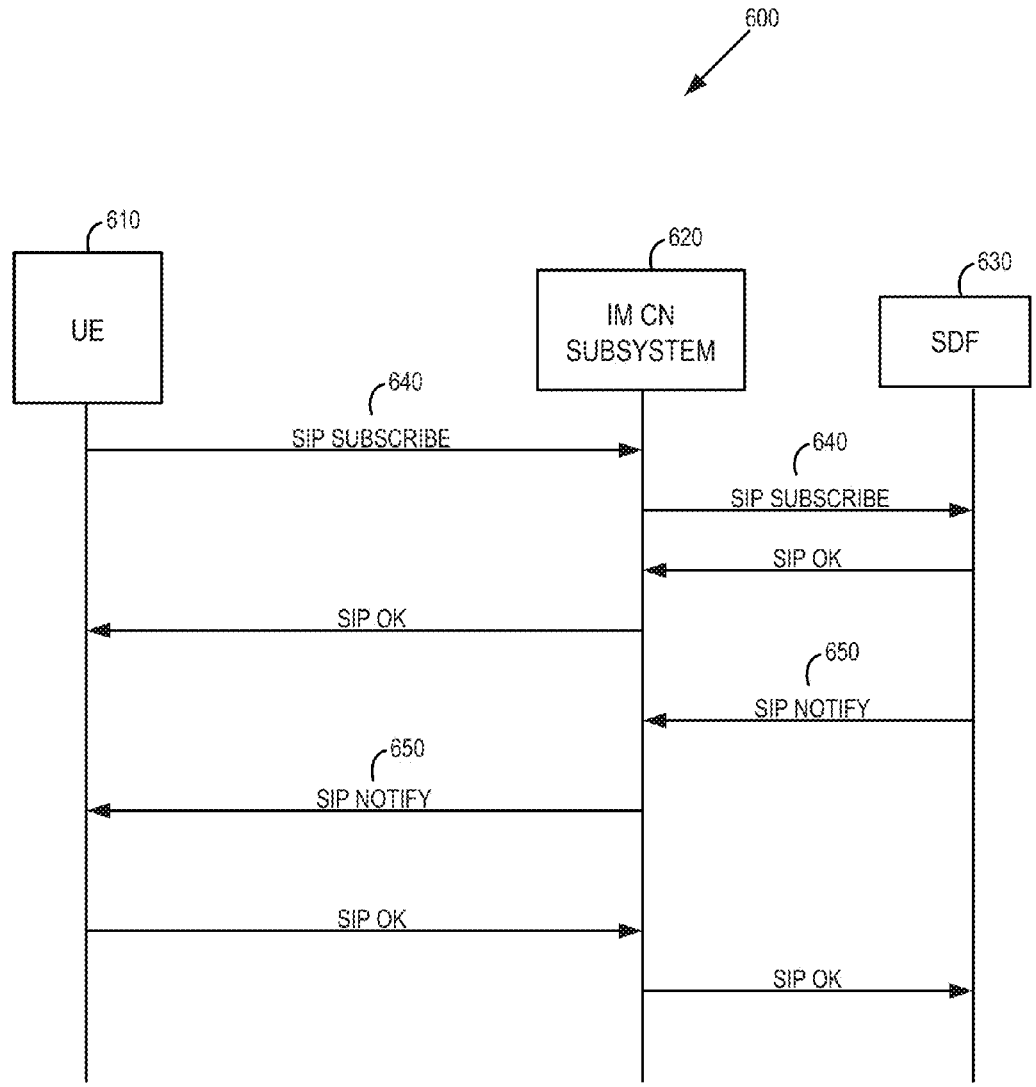
FIG. 6 is a message-flow control diagram showing session initiation protocol (SIP)-based service discovery using subscribe and notification messages in an IMS_PSS_MBMS streaming service, according to one embodiment.

FIG. 4 shows a DASH-enabled adaptive streaming network 400 including client 330 that obtains multimedia services from web server 320 (FIG. 3), which in turn serves the multimedia content from a web or media server 414 on which the multimedia content is stored. The web/media server 414 receives the multimedia content via audio/video input 416, which may be a live input stream or previously stored media content, wherein the media is streamed to the client 410. Web/media server 414 may include a media encoder 424 to encode the media content to a suitable format, and media segmenter 426 to split the input media content into a series of fragments or chunks suitable for streaming. Client 410 may include a web browser 418 to interact with web server 412 and a media decoder/player 420 to decode and render the streaming multimedia content.

In some embodiments, the client 410 opens one or several TCP connections to one or several standard HTTP servers or caches. The client 410 then retrieves an MPD (metadata) file providing information on the structure and different versions of the media content stored in the web/media server 414, including, for example, different bitrates, frame rates, resolutions, codec types, and other information specified in the DASH MPD data model standard ISO/IEC 23009-1: 2012 (E). The MPD is used to convey the HTTP URL of each segment and associated metadata information to map segments into the media presentation timeline. The client 410 requests new data in chunks using HTTP GET or partial HTTP GET messages to obtain smaller data segments (HTTP GET URL(FRAG1 REQ), FRAGMENT 1, HTTP GET URL (FRAGi REQ), FRAGMENTi) of the selected version of media file with individual HTTP GET messages which imitates streaming via short downloads as shown in FIG. 4. The URL of the HTTP GET message tells the web server 412 which Segment or Segments the client is requesting. As a result, the web browser 418 pulls the media from web server 412 Segment by Segment (or Sub-Segment by Sub-Segment based on byte range requests).

Figure 5:
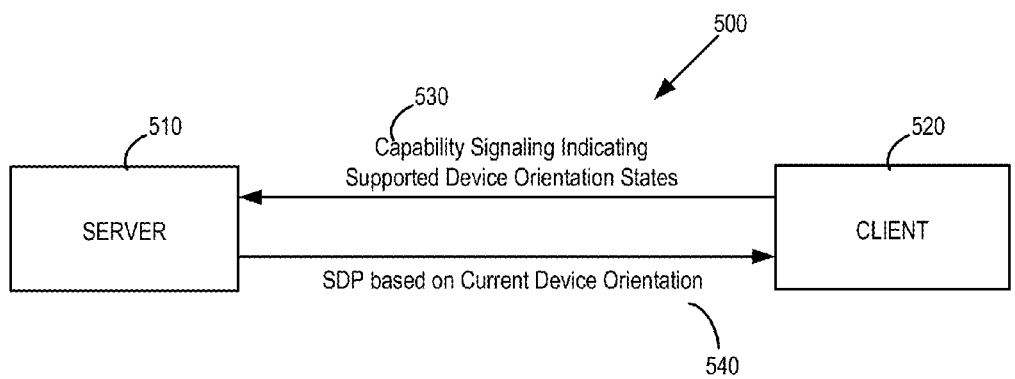
FIG. 5 is a high-level block diagram of a Real-time Streaming Protocol (RTSP) client device and a server for RTSP-based streaming multimedia content adapted according to device orientation, according to one embodiment.

FIG. 5 shows a high-level server-client interaction 500 in the context of push-based streaming (PSS and IMS_PSS_MBMS). In this context, a server 510 receives from a client 520 capability exchange signaling information 530 and adapts the content based on device orientation. In a push-based model, the server 510 selects a content version among stored content versions, or it dynamically transcodes the content based on the current device orientation and streams the content to the client 520. Session-related metadata is provided 540 to the client 520 in session description protocol (SDP) that describe the device orientation information associated the streamed content.

In the PSS service, the client 520 typically sends the device orientation information in a RTSP DESCRIBE message to the server 510. This message may also include the DefaultOrientation attribute (Table 2), indicating the device orientation in the absence of any further signaling from the client 520. Additionally, ProfDiff signaling is used to temporarily adjust the device capability profile when the current device orientation is different from the default device orientation. PSS content servers supporting capability exchange can also receive device orientation information from the client in any other subsequent HTTP or RTSP requests.

In the IMS_PSS_MBMS service, the client 520 can send device orientation information in a SIP SUBSCRIBE message to the IP Multimedia (IM) Core Network (CN) Subsystem during service discovery, which then forwards the message to the Service Discovery Function (SDF). For example, FIG. 600 shows a device orientation message exchange 600 between UE 610 (the same as or interchangeable with UE 110), IM CN subsystem 620, and SDF 630. The IM CN subsystem 620 and the SDF 630 may be part of a core network domain that interfaces with the access network domain, e.g., the RAN 168 (FIG. 1).

A SIP SUBSCRIBE message 640 may also include a default device orientation attribute, indicating the device orientation in the absence of any further signaling from the client 610. The SDF 630 determines the proper service discovery information, e.g. according to the capabilities of the UE 610, for a user's profile (Personalized Service Discovery). The SDF 630 sends a SIP NOTIFY message 650 to the UE 610 that includes service discovery information for the IM CN subsystem 620, which relays the SIP NOTIFY message 650 back to the UE 610. Each message relay is acknowledged with a SIP OK message. This messaging framework enables optimized service discovery utilizing the device orientation information in PSS and MBMS user services. Subsequently, during the IM Subsystem (IMS) session, the UE 610 may also use SIP signaling to indicate updates, including any temporary adjustments to the device orientation based on ProfDiff, i.e., if the current device orientation is different from the default device orientation. Updates are signaled by refreshing the subscription through further SIP SUBSCRIBE messages including the current device orientation information.

Figure 7:
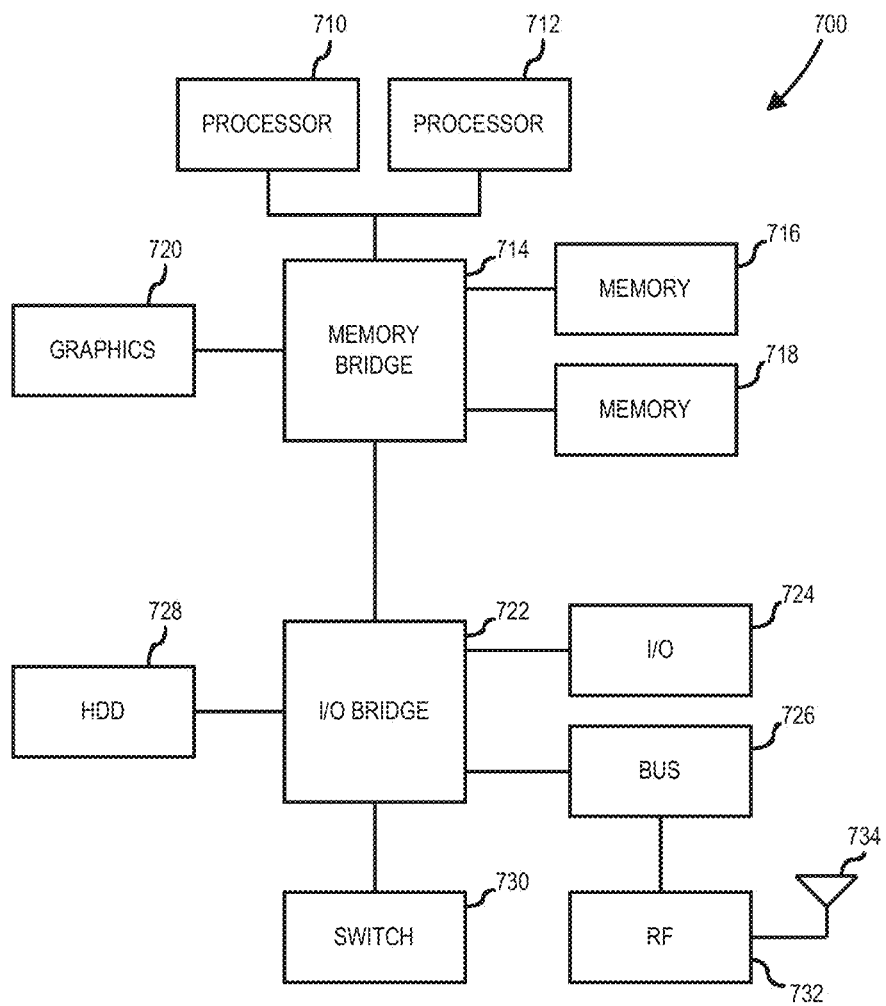
FIG. 7 is a block diagram of an information handling system implementing capability signaling and multimedia adaptation, according to one embodiment.

FIG. 7 shows a block diagram of an information handling system 700 capable of implementing device orientation capability exchange signaling and server adaptation of multimedia content in response to device orientation, in accordance with one or more embodiments. Information handling system 700 of FIG. 7 may tangibly embody one or more of any of the network elements of network 100 as shown in and described with respect to FIG. 1, 3, 4, or 5. For example, information handling system 700 may represent the hardware of client 110, media server 112, or device capability sever 130, with greater or fewer components depending on the hardware specifications of the particular device or network element. For example, as UE, the system 700 typically would include an orientation sensor. Although the information handling system 700 represents one example of several types of computing platforms, the information handling system 700 may include more or fewer elements and/or different arrangements of elements than shown in FIG. 7.

The information handling system 700 includes one or more processors such as processor 710 and/or processor 712, which may include one or more processing cores. The one or more of processors 710, 712 may couple to one or more memories 716 and/or 718 via memory bridge 714, which may be disposed external to the processors 710, 712, or at least partially disposed within one or more of the processors 710, 712. The memory 716 and/or memory 718 may include various types of semiconductor-based memory, for example, volatile type memory and/or non-volatile type memory. The memory bridge 714 may couple to a graphics system 720 to drive a display device (not shown) coupled to the information handling system 700.

The information handling system 700 may further include an input/output (I/O) bridge 722 to couple to various types of I/O systems. I/O system 724 may include, for example, a universal serial bus (USB) type system, an Institute of Electrical and Electronics Engineers (IEEE) 1394 type system, or the like, to couple one or more peripheral devices to the information handling system 700. A bus system 726 may include one or more bus systems such as a peripheral component interconnect (PCI) express type bus or the like, to connect one or more peripheral devices to the information handling system 700. A hard disk drive (HDD) controller system 728 may couple one or more hard disk drives or the like to the information handling system 700, for example, Serial ATA type drives or the like, or, alternatively, a semiconductor-based drive comprising flash memory, phase change, and/or chalcogenide-type memory or the like. A switch 730 may be utilized to couple one or more switched devices to the I/O bridge 722, for example, Gigabit Ethernet type devices or the like. Furthermore, as shown in FIG. 7, information handling system 700 may include a radio-frequency (RF) transceiver 732 comprising RF circuits and devices coupled to one or more antennas 734 for wireless communication with other wireless communication devices and/or via wireless networks such as the transmission system 400 of FIG. 4. Where the information handling system includes multiple antennas 734, the RF receiver 732 may implement multiple-input, multiple-output (MIMO) communication schemes, although the scope of the claimed subject matter is not limited in this respect. An example embodiment of an information handling system in the context of a UE is shown in and described with respect to FIG. 8, below.

Figure 8:
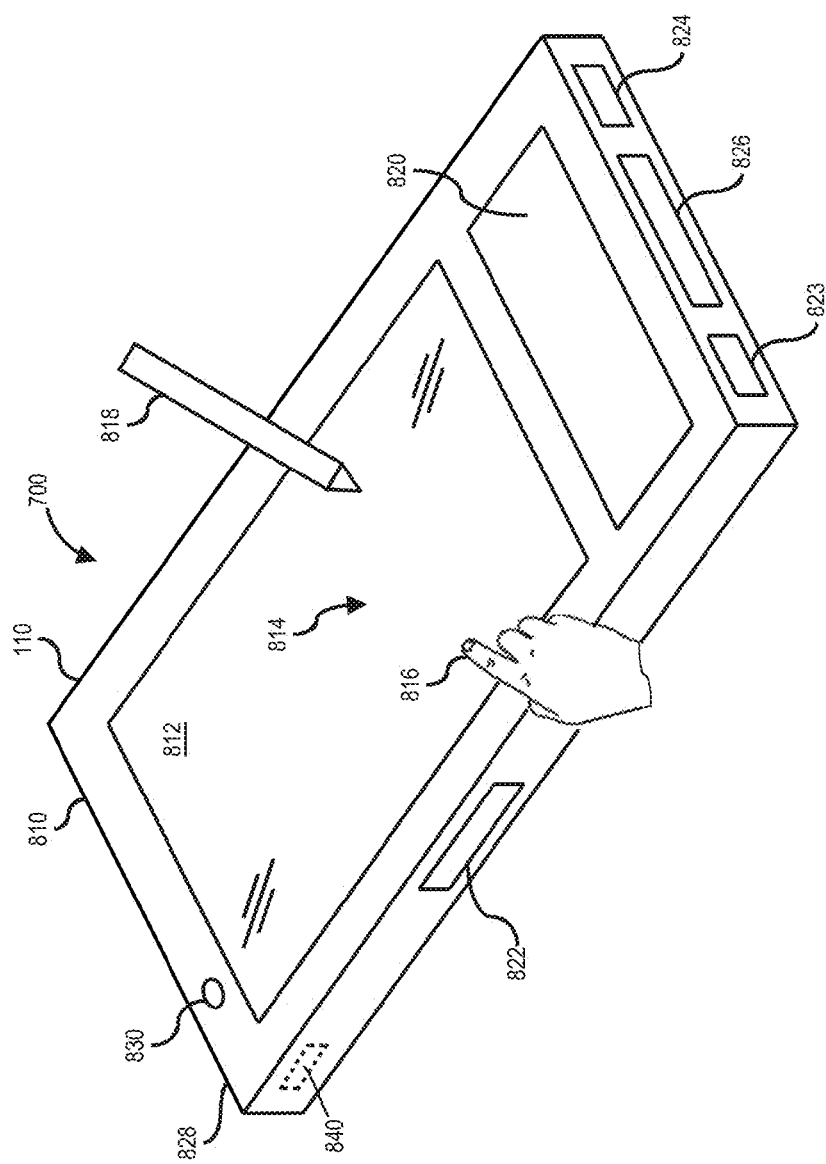
FIG. 8 is an isometric view of an information handling system of FIG. 7, according to a mobile tablet computer embodiment.

FIG. 8 is an isometric view of an information handling system 700 of FIG. 7, embodied as a cellular telephone, smartphone, a tablet-type device, or the like. The system 700 includes the client 110 of FIG. 1, and it implements device orientation capability exchange signaling and initiates server adaptation of multimedia content in response to device orientation. The information handling system 700 may include a housing 810 having a display 812 which may include a touch screen 814 for receiving tactile input control and commands via a finger 816 of a user and/or via a stylus 818 to control one or more processors 710 or 712. The housing 810 may house one or more components of the information handling system 700, for example, one or more processors 710, 712, one or more of memory 716, 718, or transceiver 732. The information handling system 700 further may optionally include a physical actuator area 820, which may include a keyboard or buttons for controlling information handling systems via one or more buttons or switches. The information handling system 700 may also include a port or slot 822 for receiving non-volatile memory such as flash memory, for example, in the form of a secure digital (SD) card or a subscriber identity module (SIM) card. Optionally, the information handling system 700 may further include one or more speakers 823 and microphones 824, and a connection port for connecting the information handling system 700 to another electronic device, dock, display, battery charger, and so on. In addition, the information handling system 700 may include a headphone or speaker jack 828 and one or more cameras 830 on one or more sides of the housing 810. The system 700 includes an internal orientation sensor 840. It should be noted that the information handling system 700 of FIGS. 7 and 8 may include more or fewer elements than shown, in various arrangements.

It will be understood by skilled persons that many changes may be made to the details of the above-described embodiments without departing from the underlying principles of the invention. Therefore, the scope of the present invention should be determined only by the following claims.

The invention claimed is:

1. A user equipment (UE) configured to wirelessly communicate with a remote media content server and initiate capability exchange signaling, the UE comprising:
   an orientation sensor;
   a display device;
   a radio-frequency transceiver;
   a processor operably coupled to the radio-frequency transceiver; and
   a memory operably coupled to the processor, the memory storing instructions that configure the processor to:
      transmit, via the radio-frequency transceiver, information that provides device orientation capabilities of the UE to the remote media content server or a device profile server, the device orientation capabilities of the UE including one or more predetermined orientation positions that correspond to orientation information provided by the orientation sensor;
      transmit to the remote media content server a message indicating a current orientation state and including a request for video content for display with the display device based on the device orientation capabilities of the UE;
      receive from the remote media content server a session description protocol (SDP) file for delivery of the video content selected from a group comprising:
         streaming the video content according to a real-time streaming protocol (RTSP),
         communicating the video content using dynamic adaptive streaming over HTTP (DASH), and
         downloading the video content over HTTP or File Delivery over Unidirectional Transport (FLUTE) protocol; and
      receive from the remote media content server the video content that is identified in the SDP file and selected by the remote media content server based on the current orientation state of the UE.

2. The UE of claim 1, in which the instructions further configure the processor to:
   receive from the remote media content server a manifest file describing multiple versions of the video content configured for playback on the display device according to orientation states indicated in the device orientation capabilities of the UE.

3. The UE of claim 2, in which the multiple versions of the video content are encoded based on device orientation capabilities for playback on mobile device displays, and in which the instructions further configure the processor to:

select, for streaming or download delivery, based on the current orientation state of the UE, a version of the video content described in the manifest file.

4. The UE of claim 3, in which the manifest file comprises a media presentation description (MPD) file, and in which the instructions further configure the processor to:
provide the information that indicates the device orientation capabilities of the UE to the remote media content server with a hypertext transfer protocol (HTTP) POST message;
request from the media content server the MPD file via an HTTP GET message;
receive from the remote media content server the MPD file; and
request the selected version of the video content from the remote media content server using dynamic adaptive streaming over HTTP (DASH).

5. The UE of claim 1, in which the remote media content server includes an IP multimedia subsystem (IMS) based packet switched streaming service, and in which the instructions further configure the processor to:
transmit in a session initiation protocol (SIP) SUBSCRIBE message to an Internet Protocol Multimedia Core Network subsystem during service discovery the information that provides device orientation capabilities of the UE.

6. A method of controlling delivery of streaming or download of multimedia content from a server to a user equipment (UE) client over a wireless network, the method comprising:
providing to the server, via capability exchange signaling, information indicative of device orientation capability of the client to interpret video orientation information from the server according to device orientation modes supported at the client;
receiving from the server, in response to the information, a metadata file identifying a version of the multimedia content that is available for streaming or downloading to the client and is configured for an orientation mode of a display device of the client;
determining the orientation mode of the display device of the client; and
streaming or downloading via the wireless network, the version of the multimedia content that is identified in the metadata file and selected based on a physical orientation of the client, wherein the wireless network employs at least one of packet switched streaming service (PSS), integrated multimedia subsystems (IMS) based PSS, and multimedia broadcast and multicast service MBMS (IMS_PSS_MBMS).

7. The method of claim 6, in which the client comprises a mobile device and the information includes mobile device identity information that identifies the mobile device by model.

8. The method of claim 7, in which the server comprises a PSS server, and in which the step of providing comprises:
initiating a device capability profile exchange between the PSS server and a device profile server that stores device capability profiles of multiple mobile device models, a device capability profile including a list of predetermined device orientation modes supported by the client.

9. The method of claim 6, further comprising:
dynamically switching between streams of the multimedia content based on changes to the physical orientation of the client.

10. The method of claim 6, in which the orientation mode includes at least one of a landscape mode, a portrait mode, and a seascape mode.

11. The method of claim 6, in which the metadata file comprises a session description protocol (SDP) file for delivery of the multimedia content selected from a group comprising:
streaming the multimedia content according to a real-time streaming protocol (RTSP),
delivering the multimedia content using dynamic adaptive streaming over HTTP (DASH), and
downloading the multimedia content over HTTP or File Delivery over Unidirectional Transport (FLUTE) protocol.

12. The method of claim 6, in which the metadata file comprises a media presentation description (MPD) file for streaming the multimedia content according to dynamic adaptive streaming over HTTP (DASH).

13. One or more non-transitory computer-readable media having instructions that, when executed, cause a media content server to:
receive, via a communication network, a device orientation attribute that includes a list of device orientation positions supported by a client terminal of a wireless communication network, the device orientation positions relevant for streaming or download of video content over a transport protocol supported by a packet switched streaming service application on the client terminal;
adapt video content based on the device orientation attribute through one or more processes including content selection, capture, compression, and transcoding operations;
generate a session description or metadata file to establish a streaming or download session based on the device orientation attribute; and
deliver the adapted video content and the generated session description or metadata file to the client terminal.

14. The one or more non-transitory computer-readable media of claim 13, in which the list of device orientation positions includes one or more indication selected from a group comprising of video display device orientation modes, video capture device orientation modes, video display device orientation angles, video capture device orientation angles, a boolean-valued indicator having values indicating whether the client terminal is responsive to changes in orientation, default device orientation for rendering and display, default device orientation for capture, number of equally-spaced angular granularity levels in a 90 degree interval at which an orientation sensor of the client terminal is configured to detect orientation changes during both video capture and display, number of cameras associated with the client terminal, and horizontal mirroring support.

15. The one or more non-transitory computer-readable media of claim 13, wherein the list comprises a list of one or more orientation positions that respectively correspond to one or more device orientation modes supported by the client terminal.

16. The one or more non-transitory computer-readable media of claim 13, wherein the transport protocol comprises a real-time transport protocol (RTP).

17. The one or more non-transitory computer-readable media of claim 13, wherein the transport protocol comprises a hypertext transport protocol (HTTP).

18. The one or more non-transitory computer-readable media of claim 13, wherein the session description or metadata file is a session description protocol (SDP) file for delivery of the video content selected from a group comprising:
streaming the video content according to a real-time streaming protocol (RTSP), streaming the video content using dynamic adaptive streaming over HTTP (DASH), and downloading the video content over HTTP or File Delivery over Unidirectional Transport (FLUTE) protocol, or a media presentation description (MPD) file for DASH.

19. The one or more non-transitory computer-readable media of claim 13, wherein the instructions, when executed, further cause the media content server to:

transcode the video content or convert a format of the video content based on the device orientation attribute.

20. The one or more non-transitory computer-readable media of claim 13, wherein the device orientation attribute is received from a device profile server via the communication network, and wherein the client terminal comprises a user equipment (UE).

21. A user equipment (UE) configured for coordination of video orientation in a third generation partnership project (3GPP) network, the UE comprising:

a network interface to communicate with a packet-switched streaming service (PSS) server through a radio access network (RAN) of the 3GPP network; and a PSS client to:

signal, through the network interface, a capability of the PSS client to interpret video orientation information;

receive, through the network interface from the PSS server, a session description protocol (SDP) file, the SDP file including current video orientation information indicating a current orientation of video received from the PSS server; and rotate the video received from the PSS server based on the current orientation indicated in the current video orientation information.

22. The UE of claim 21, wherein the PSS client is further configured to execute a capability exchange with the PSS server, the capability exchange including at least one of the capability of the PSS client to interpret the video orientation information and a capability of the client to display the video based on the video orientation information.

23. The UE of claim 22, wherein the capability exchange further includes an indication of a granularity of rotation angles provided by the UE.

24. The UE of claim 23, wherein the indication of the granularity is selected from a group comprising:

a lower granularity corresponding to 90-degree rotation modes, and a higher granularity corresponding to a plurality of equally-spaced angular granularity levels within a 90 degree interval.

25. The UE of claim 21, wherein the PSS client is further configured to horizontally flip the video received from the PSS server based on the current orientation indicated in the current video orientation information.

26. The UE of claim 21, wherein the PSS client is further configured to rotate the video before horizontally flipping the video.

27. The UE of claim 21, further comprises one or antennas for wireless communications with at least one of a wireless communication device and a wireless network.

28. The UE of claim 21, further comprising at least one of a speaker, a microphone, a connection port, a keyboard, a touch screen, a battery, and a memory port.

29. One or more non-transitory computer-readable media having instructions that, when executed, cause a media content server to:

perform packet-switched streaming service (PSS) capability exchange with a user equipment (UE) through a third generation partnership project (3GPP) network, the PSS capability exchange specifying device capability attributes for coordination of video orientation;

select, based on the PSS capability exchange, content comprising a first orientation of an image; and signal the first orientation of the image to the UE.

30. The one or more non-transitory computer-readable media of claim 29, wherein the instructions, when executed, further cause the media content server to:

receive an indication of a change in a current orientation of the UE;

in response to the indication of the change in the current orientation of the UE, select content at the server comprising a second orientation of the image; and signal to the UE the second orientation of the image.

31. The one or more non-transitory computer-readable media of claim 29, wherein the instructions, when executed, further cause the media content server to:

signal the first orientation of the image to the UE in a session description protocol (SDP) file and a real-time transport protocol (RTP).

32. The one or more non-transitory computer-readable media of claim 29, wherein the instructions, when executed, further cause the media content server to:

receive, from the PSS capability exchange through the 3GPP network, a device orientation attribute that includes a list of one or more device orientation positions, supported by the UE, relevant for video that can be included in a 3GPP file format file and handled by a packet switched streaming service application on the UE; and deliver content to the UE based on the device orientation attribute.

33. The one or more non-transitory computer-readable media of claim 32, wherein the list of one or more device orientation positions includes an indication of a default orientation mode and a current orientation mode indicated by an orientation sensor of the UE.

* * * * *